United States Patent [19]

Ogland

[11] Patent Number: 4,521,656
[45] Date of Patent: Jun. 4, 1985

[54] HIGH VOLTAGE GROUNDING DEVICE FOR PRESSURIZED EQUIPMENT

[75] Inventor: Jon W. Ogland, Millersville, Md.

[73] Assignee: The United States of America as represented by the Secretary of the Air Force, Washington, D.C.

[21] Appl. No.: 549,532

[22] Filed: Nov. 8, 1983

[51] Int. Cl.³ .............................................. H01H 33/54
[52] U.S. Cl. ..................... 200/148 B; 200/81 R; 200/83 W
[58] Field of Search ............ 200/148 B, 148 G, 81 R, 200/61.04–61.07, 83 W

[56] References Cited

U.S. PATENT DOCUMENTS

| | | | |
|---|---|---|---|
| 2,169,857 | 8/1939 | Treanor | 200/81 |
| 3,404,247 | 10/1968 | Glassanos | 200/144 |
| 3,601,057 | 8/1971 | Kline | 102/70.2 R |
| 3,898,404 | 8/1975 | Martincic | 200/83 W |
| 4,002,869 | 1/1977 | Taccetta et al. | 200/61.7 |
| 4,014,213 | 3/1977 | Parquet | 200/83 W |
| 4,140,929 | 2/1979 | Somerville | 307/326 |

*Primary Examiner*—Robert S. Macon
*Attorney, Agent, or Firm*—Donald J. Singer; Richard J. Donahue

[57] ABSTRACT

A safety device for discharging high voltage circuits operated in pressurized containers. The device is positioned within an elbow or other protrusion through which passes the high voltage feed-through electrode. In one embodiment the grounding contact is automatically forced against the high voltage contact by the expansion of a bellows upon decompression of the container while in an alternate embodiment, the grounding contact is manually threaded against the high voltage contact.

7 Claims, 7 Drawing Figures

HIGH VOLTAGE GROUNDING DEVICE FOR PRESSURIZED EQUIPMENT

STATEMENT OF GOVERNMENT INTEREST

The invention described herein may be manufactured and used by or for the Government for governmental purposes without the payment of any royalty thereon.

BACKGROUND OF THE INVENTION

The present invention concerns a safety device for grounding high voltage circuits which are enclosed within pressurized containers.

According to certain military standards for electronic equipment, a safety device is required in all equipment operating above 70 volts whereby circuits can be grounded or discharged in case of failure and repairs. A similar requirement also exists for commercial high voltage equipment. On ground based stationary equipment, this requirement is readily satisfied by conventional grounding rods. On airborne and on some mobile high voltage equipments however, weight and space limitations necessitate enclosure of circuits in sealed containers or tanks which are pressurized with a gas, such as sulphur hexafluoride. The circuits therefore become inaccessible for discharging by conventional means.

In the event that bleeder networks have failed, removing external interconnecting cables in order to gain access to the circuits can expose the operator to high and dangerous voltage unless special precautions have been taken to discharge the high voltages to protect the personnel. The then exposed terminals cannot readily be used for grounding purposes, however, since any procedure that may generate an arc is prohibited in an aircraft or other environment where gasoline fumes may be present. Therefore, a discharge device is needed that performs the grounding within the sealed environment. When in the open position, the device must be capable of safely withstanding the system operating voltage which in a typical system, approximates 85000 volts. Because of necessary dense packaging of these electronic equipments within the tanks, and because of the desirability of uniformity between tanks, the safety grounding device cannot be installed within the circuitry proper.

SUMMARY OF THE INVENTION

Accordingly, it is a general object of the present invention to provide an improved high voltage grounding device for use in pressurized electronic containers.

It is another object of the present invention to provide a high voltage grounding device which is mechanically simple and automatically actuated upon loss of pressure within a sealed container.

It is a further object of the present invention to provide a high voltage grounding device for use within a pressurized container and having external actuating means.

BRIEF DESCRIPTION OF THE DRAWINGS

Additional objectives, features and advantages of the present invention will become apparent from the following description when read in conjunction with the accompanying drawings, wherein.

DESCRIPTION OF THE PREFERRED EMBODIMENTS

Figure 1:
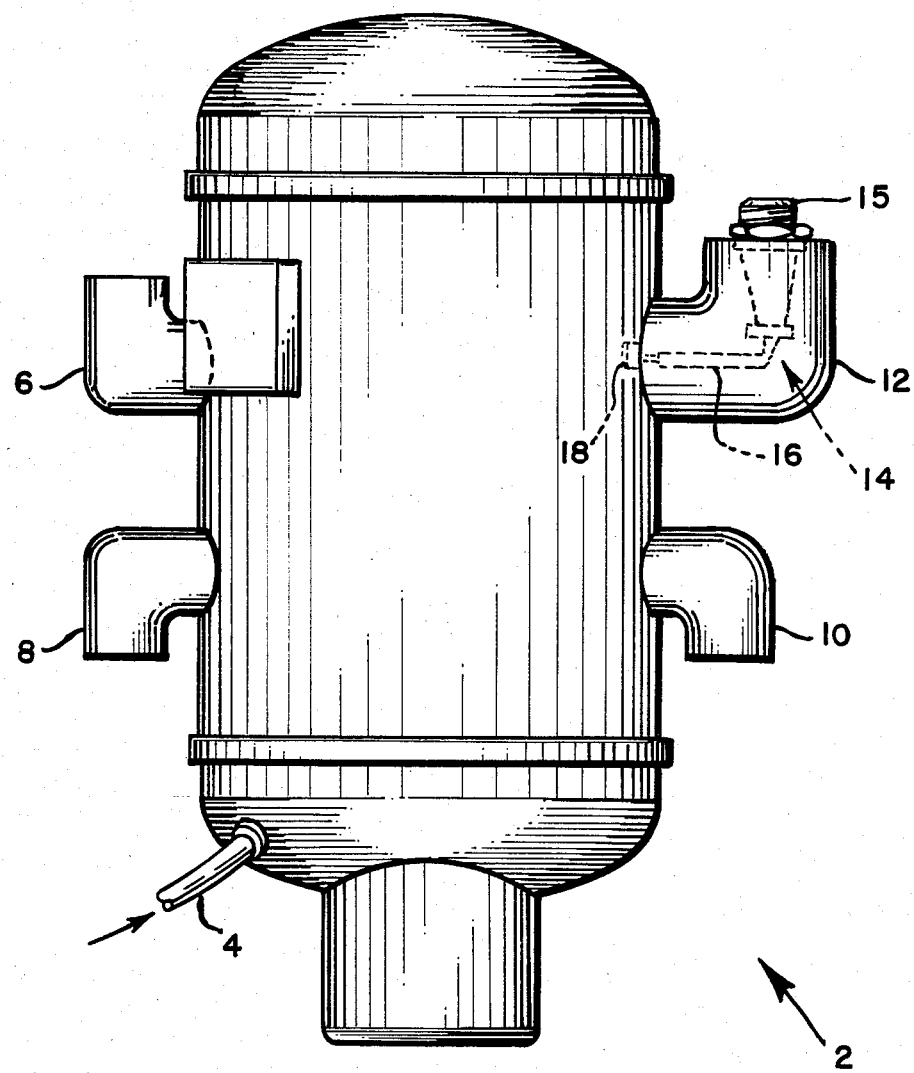
FIG. 1 is a pictorial representation of the pressurized tank of the present invention.

Referring now to FIG. 1 of the drawings, there is illustrated a sealed tank 2 having a pressurization line 4 and protrusions in the form of elbows 6, 8, 10 ad 12 adapted to couple electrical signals and power to and from tank 2 while being internally sealed against the loss of pressure from tank 2. Elbow 12 is specifically used to couple high voltage to the circuitry contained within tank 2 and has therein a high voltage electrode assembly 14 having a feedthrough connector 15 and tubular conductor 16 leading to a high voltage terminal 18 positioned within tank 2.

Figure 2A:
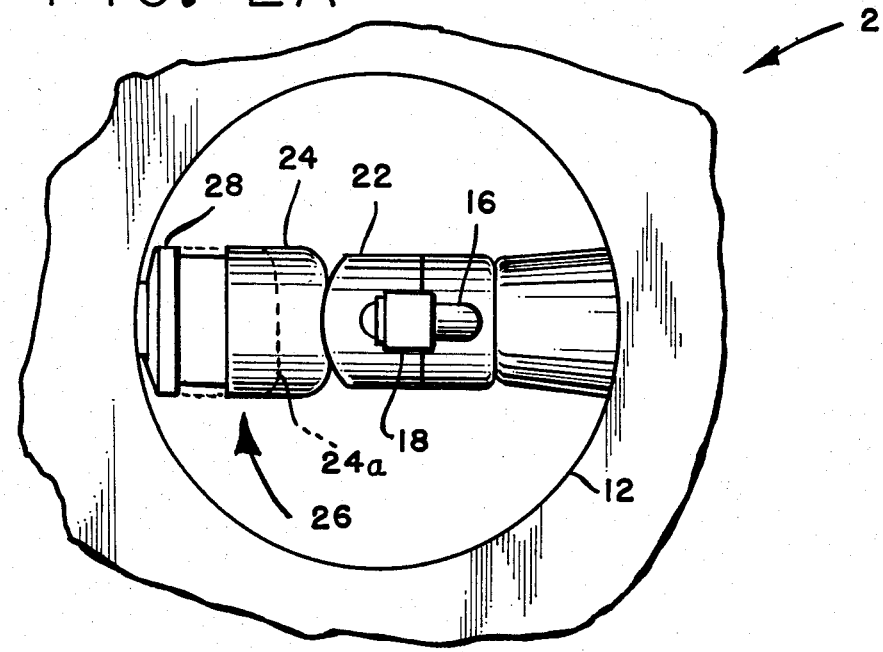
FIGS. 2A and 2B are a top view and a sectioned side view respectively of the installed pressure-operated high voltage grounding device of the present invention.
Figure 2B:
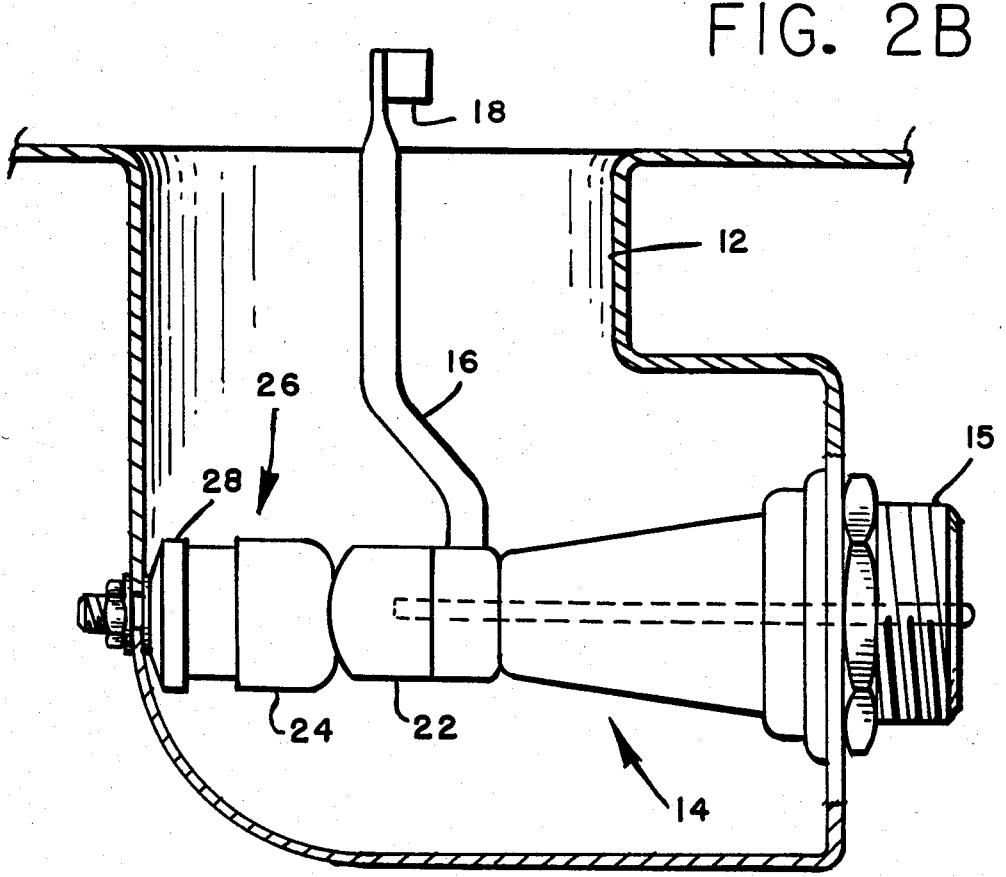

FIGS. 2A and 2B provide an enlarged top view and sectioned side view respectively of the elbow 12 which has been modified to include the present invention. High voltage electrode assembly 14 now includes a fixed contact 22 whose curved surface is shown bearing against a moveable contact or cup 24 of a pressure-operated grounding device 26. In FIG. 2A, the contact button 24 is also shown in its contracted position 24a which, as will become apparent, it assumes upon pressurization of tank 2, leaving a gap of approximately one half inch to the fixed contact 22 of high voltage electrode assembly 14.

Figure 3A:
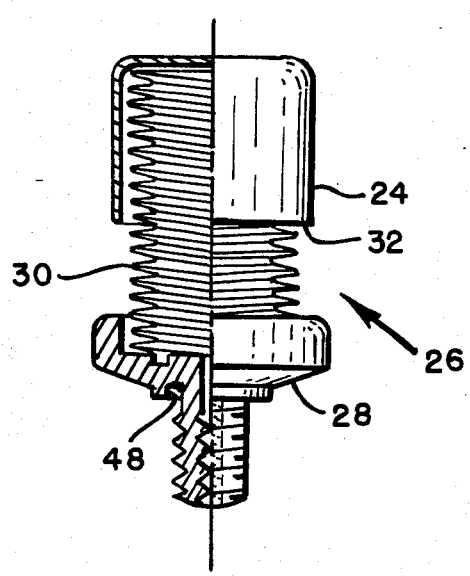
FIGS. 3A and 3B are a partially sectioned side view and a bottom view respectively of the pressure-operated grounding device of the present invention.
Figure 3B:
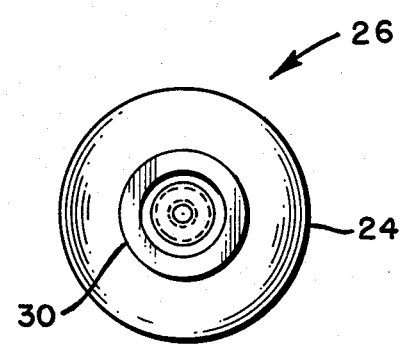

FIGS. 3A and 3B depict a partially sectioned side view and bottom view respectively of the pressure-operated grounding device 26. It consists of a base or stud 28 mounted as shown in FIG. 2B and a cup-shaped contact 24 partially covering a bellows 30. When tank 2 is depressurized, bellows 30 expands, and contact 24 is pressed against the contact 22 of the high voltage electrode assembly 14 with a force of one to two pounds. When tank 2 is pressurized, bellows 30 is compressed, and the rim 32 of the cup is pressed against stud 28 with a force of about 15 pounds.

With a sulphur hexafluoride pressure of 32 pounds per square inch and an electrode gap of one half inch, the grounding device will withstand about 250 kilovolts which is well above the operating voltage of the enclosed electronic circuitry.

Figure 4A:
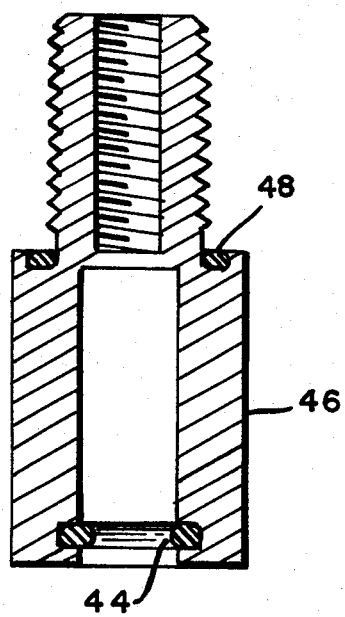
FIGS. 4A and 4B are side views of the mounting stud and stem elements respectively of the manually-operated grounding device of the present invention.
Figure 4B:
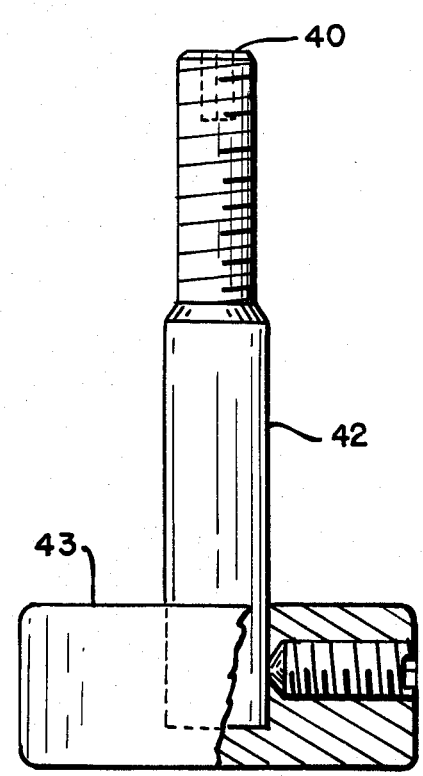

Instead of making use of internal gas pressure to operate the grounding device, the device shown in FIGS. 3A and 3B can be replaced by the manually operated grounding device shown disassembled in FIGS. 4A and 4B. Here, the closing of the electrode gap is performed by inserting an Allen wrench in the hexagonal bore 40 in the stem 42 and turning the screw thread until contact pressure is felt between the grounding contact 43 and the high voltage contact 22. Gas leakage along the stem is prevented by an internal O-ring 44 at the inner end of the mounting stud 46. In both versions of the grounding device, gas leakage between the stud and the elbow wall is prevented by an O-ring 48 surrounding the threaded end protruding through the elbow wall.

Although the invention has been described with reference to particular embodiments thereof, it will be understood to those skilled in the art that the invention is capable of a variety of alternative embodiments within the spirit and scope of the appended claims.

What is claimed is:

1. Safety apparatus for grounding high voltage within a pressurized metallic container to the container comprising:
   a protruding metallic conduit affixed to the wall of said container and sealed to prevent loss of gas pressure within said container,
   an electrode assembly positioned within said conduit for coupling high voltage to the interior of said container,
   a high voltage contact affixed to said electrode, and
   a grounding device affixed to the wall of said conduit having a moveable grounding contact,
   said grounding contact being selectively adapted to bear against said high voltage contact to discharge high voltage to said container.

2. Apparatus as defined in claim 1 wherein said metallic conduit is a ninety degree elbow.

3. Apparatus as defined in claim 2 wherein said grounding device further comprises:
   a threaded stud for affixing said grounding device to the wall of said conduit, and
   a metallic bellows having one end thereof attached to said stud and the other end thereof attached to said moveable ground contact,
   said bellows being compressed by gas pressure within said container to separate said grounding contact from said high voltage contact.

4. Apparatus as defined in claim 3 wherein said moveable grounding contact is a metallic cup having its open end positioned over said bellows.

5. Apparatus as defined in claim 2 wherein said grounding device further comprises:
   a threaded stud for affixing said grounding device to the wall of said conduit,
   a threaded stem having said grounding contact affixed to one end thereof and having the other end thereof inserted into a threaded bore in said stud, and
   means for turning said threaded stem to cause said grounding contact to bear against said high voltage contact in the absence of gas pressure within said container.

6. Apparatus as defined in claim 5 wherein said means for turning said threaded stem includes a hexagonal bore formed in said other end of said stem.

7. Apparatus as defined in claim 6 wherein said grounding contact comprises a cylindrical metallic disc having an axial bore therein for affixing said grounding contact to said stem.

* * * * *